(12) United States Patent  
Moser et al.

(10) Patent No.: US 8,943,086 B2  
(45) Date of Patent: Jan. 27, 2015

(54) MODEL-BASED BACKEND SERVICE ADAPTATION OF BUSINESS OBJECTS

(75) Inventors: Gerd Moser, Stetten a.k.M.-Frohnstetten (DE); Dhaval Desai, Malvern, PA (US); Santosh V, Bangalore (IN); Manish Joshi, Bangalore (IN); Karthikeyan Loganathan, Konena Agrahara (IN); Santosh Kumar Addanki, Bangalore (IN); Suvarna Kharidehal, Bangalore (IN); Antony Raja T, Bangalore (IN); Anomit Ghosh, Bangalore (IN); Marina Wochner, Stetten a.k.M. (DE); Peter Roth, Horgenzell (DE); Thomas Mocker, Markdorf (DE); Steffen Schloenvoigt, Markdorf (DE)

(73) Assignee: SAP SE, Walldorf (DE)

( * ) Notice: Subject to any disclaimer, the term of this patent is extended or adjusted under 35 U.S.C. 154(b) by 47 days.

(21) Appl. No.: 13/593,784

(22) Filed: Aug. 24, 2012  
(Under 37 CFR 1.47)

(65) Prior Publication Data  
US 2014/0006368 A1   Jan. 2, 2014

Related U.S. Application Data

(60) Provisional application No. 61/666,512, filed on Jun. 29, 2012.

(51) Int. Cl.  
*G06F 17/30* (2006.01)  
*G06F 9/54* (2006.01)  
*G06Q 10/06* (2012.01)

(52) U.S. Cl.  
CPC .......... *G06F 17/30386* (2013.01); *G06F 9/541* (2013.01); *G06Q 10/067* (2013.01)  
USPC ........................................................ 707/760

(58) Field of Classification Search  
CPC ..................... G06F 17/30424; G06F 17/30427  
USPC .......................................... 707/759, 760, 763  
See application file for complete search history.

(56) References Cited

U.S. PATENT DOCUMENTS

| | | |
|---|---|---|
| 2003/0130749 A1 | 7/2003 | Haag et al. |
| 2004/0117377 A1 | 6/2004 | Moser et al. |
| 2006/0064671 A1 | 3/2006 | Herter et al. |
| 2006/0095439 A1 | 5/2006 | Buchmann et al. |
| 2009/0024424 A1 | 1/2009 | T et al. |
| 2009/0144252 A1* | 6/2009 | Koch et al. ........................ 707/4 |
| 2009/0248586 A1 | 10/2009 | Kaisermayr et al. |
| 2011/0154369 A1 | 6/2011 | Thormaehlen et al. |
| 2012/0067063 A1 | 3/2012 | Joshi et al. |

(Continued)

*Primary Examiner* — Khanh Pham  
(74) *Attorney, Agent, or Firm* — Fish & Richardson P.C.

(57) ABSTRACT

The disclosure generally describes computer-implemented methods, software, and systems for allowing model-based backend services adaptations of business objects. One computer-implemented method includes receiving, at a generic interface associated with at least one backend application, a request for data from a particular backend application, identifying a service for execution associated with the received request based at least in part on the received request, identifying a configuration entry associated with the identified service in a configuration table, where the configuration entry defines a set of access-related information associated with at least one business object associated with the backend application, and requesting data from a business logic layer of the backend application based, at least in part, on the access-related information associated with the at least one business object.

16 Claims, 4 Drawing Sheets

(56) References Cited

U.S. PATENT DOCUMENTS

| | | |
|---|---|---|
| 2012/0109937 A1* | 5/2012 | Liensberger et al. ......... 707/722 |
| 2012/0114490 A1 | 5/2012 | Joshi et al. |
| 2012/0183131 A1 | 7/2012 | Kohler et al. |
| 2012/0197963 A1* | 8/2012 | Bouw et al. .................... 709/202 |
| 2012/0246334 A1* | 9/2012 | Yang et al. .................... 709/232 |
| 2013/0073969 A1* | 3/2013 | Blank et al. .................... 715/738 |
| 2013/0152107 A1* | 6/2013 | Ickman et al. ................. 719/320 |

* cited by examiner

MODEL-BASED BACKEND SERVICE ADAPTATION OF BUSINESS OBJECTS

CLAIM OF PRIORITY

This application claims priority under 35 USC §119(e) to U.S. Patent Application Ser. No. 61/666,512, filed on Jun. 29, 2012, the entire contents of which are hereby incorporated by reference.

TECHNICAL FIELD

The present disclosure relates to computer-implemented methods, software, and systems for allowing model-based backend services adaptations of business objects.

BACKGROUND

Access to a business suite system is typically provided through a customer graphical user interface which interfaces with back-end business objects and data through a business object layer. With the rise in use of mobile computing and other computing platforms, such as smart phones and tablet computers, among others, the use of open data protocol (OData) is becoming more prevalent. Allowing devices to access the business suite system using OData has generated further development of backend solutions for providing flexible and adaptable entries into the business suite system while minimizing the development costs.

SUMMARY

The disclosure generally describes computer-implemented methods, software, and systems for allowing model-based backend services adaptations of business objects. One computer-implemented method includes receiving, at a generic interface associated with at least one backend application, a request for data from a particular backend application, identifying a service for execution associated with the received request based at least in part on the received request, identifying a configuration entry associated with the identified service in a configuration table, where the configuration entry defines a set of access-related information associated with at least one business object associated with the backend application, and requesting data from a business logic layer of the backend application based, at least in part, on the access-related information associated with the at least one business object.

While generally described as computer implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The disclosure generally describes computer-implemented methods, software, and systems for allowing model-based backend services adaptations of business objects. For the purposes of this disclosure, a business suite is a bundle of business applications that provide integration of information and processes, collaboration tools, industry-specific functionality, and scalability. The business suite provides the delivery of end-to-end business processes which span organizational boundaries such as business departments and locations; integrates business partners such as customers, suppliers, and service providers; and allows an organization to align business plans, budgets, and operational reports. With only a web browser, business suite users can begin work once they have been authenticated, offering a single point of access to information, functionality, and services. The business suite may present information from diverse sources in a unified and structured way, and provide additional services, such as dashboards, an internal search engine, e-mail, news, navigation tools, and various other features. The business suite is often used by enterprises to providing their employees, customers, and possibly additional users with a consistent look and feel, and access control and procedures for multiple applications, which otherwise would have been separate entities altogether.

Generally, through a graphical user interface (GUI), a business suite user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Figure 1:
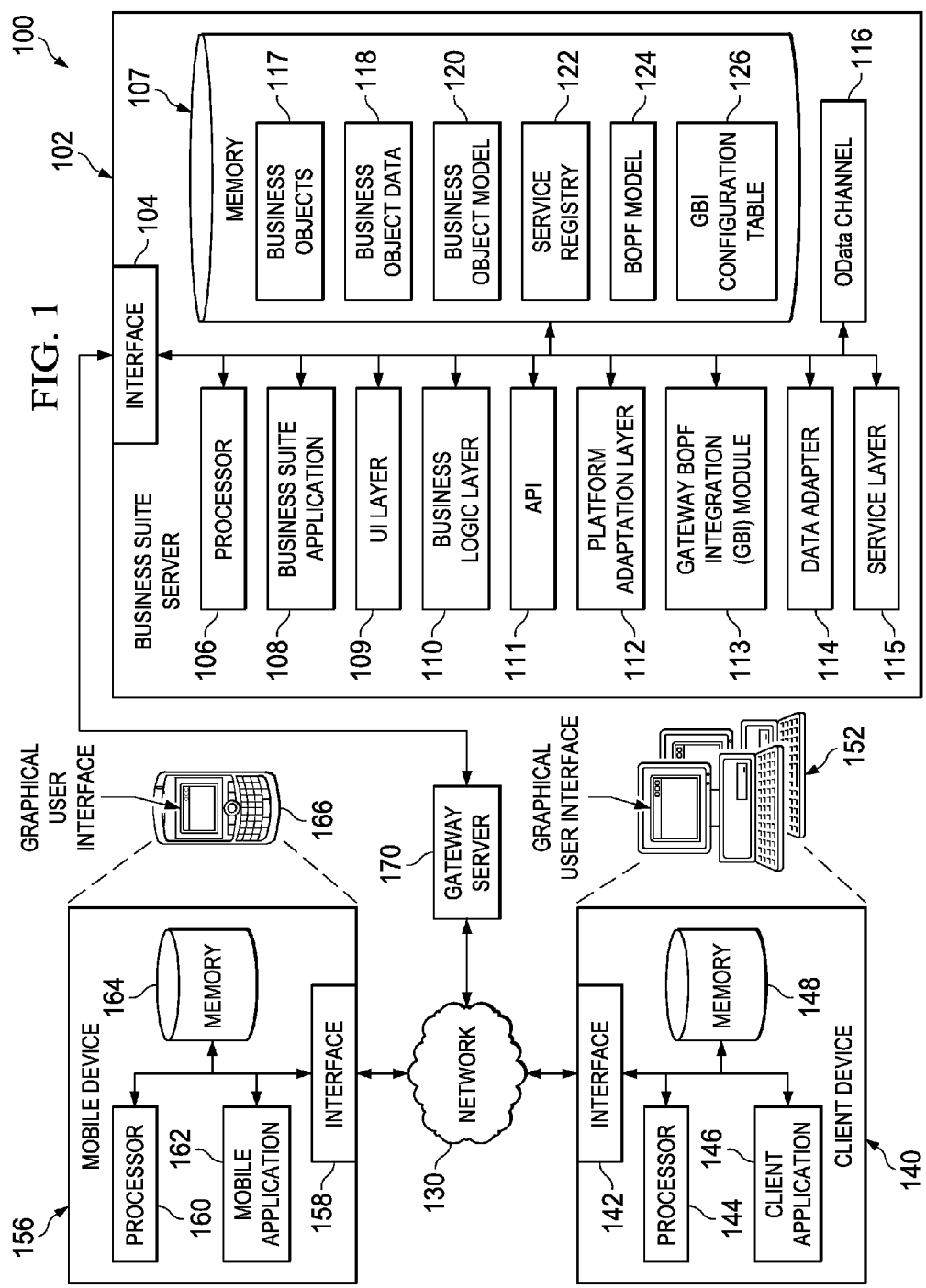
FIG. 1 is a block diagram illustrating an example system for allowing model-based backend services adaptations of business objects.

FIG. 1 is a block diagram illustrating an example system 100 for allowing model-based backend services adaptations of business objects. Specifically, the illustrated example distributed computing system 100 includes or is communicably coupled with a business suite server 102, a mobile device 156, and a client device 140 that communicate across network 130.

In general, the business suite server 102 is a server that stores one or more business suite applications 108, where at least a portion of the business suite applications 108 are executed via requests and responses sent to users or clients within and communicably coupled to the illustrated example distributed computing system 100. In some implementations, the business suite server 102 may store a plurality of various business suite applications 108. In other implementations, the business suite server 102 may be a dedicated server meant to store and execute only a single business suite application 108. In some implementations, the business suite server 102 may comprise a web server, where the business suite applications 108 represent one or more web-based applications accessed and executed by the mobile device 156 or client device 140 via the network 130 or directly at the business suite server 102 to perform the programmed tasks or operations of the business suite application 108.

At a high level, the business suite server 102 comprises an electronic computing device operable to receive, transmit, process, store, or manage data and information associated with the example distributed computing system 100. Specifically, the business suite server 102 illustrated in FIG. 1 is responsible for receiving application requests, for example business suite navigation requests, from one or more client applications 146 associated with the client device 140 and/or from one or more mobile applications 162 associated with the mobile device 156 of the example distributed computing system 100 and responding to the received requests by processing said requests in the associated business suite application 108, and sending the appropriate response from the business suite application 108 back to the requesting client application 146 or mobile application 162. In addition to requests from the respective devices, requests associated with the business suite applications 108 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single business suite server 102, environment 100 can be implemented using two or more servers 102, as well as computers other than servers, including a server pool. Indeed, business suite server 102 may be any computer or processing device such as, for example, a blade server, general-purpose personal computer (PC), Macintosh®, workstation, UNIX-based workstation, or any other suitable device. In other words, the present disclosure contemplates computers other than general purpose computers, as well as computers without conventional operating systems. Further, illustrated business suite server 102 may be adapted to execute any operating system, including Linux, UNIX, Windows, Mac OS®, Java™, Android™, iOS™ or any other suitable operating system. According to one implementation, business suite server 102 may also include or be communicably coupled with an e-mail server, a web server, a caching server, a streaming data server, and/or other suitable server.

The business suite server 102 also includes an interface 104, a processor 106, and a memory 107. The interface 104 is used by the business suite server 102 for communicating with other systems in a distributed environment—including within the environment 100—connected to the network 130 (in some instances, via the gateway server 170 as described herein); for example, the client device 140 and/or the mobile device 156, as well as other systems communicably coupled to the network 130 (not illustrated). As described, the communication channel may travel via a path from the network 130 to the gateway server 170, which then continues at interface 104 of the business suite server 102. Generally, the interface 104 comprises logic encoded in software and/or hardware in a suitable combination and operable to communicate with the network 130 and/or the gateway server 170. More specifically, the interface 104 may comprise software supporting one or more communication protocols associated with communications such that the network 130, the gateway server 170, or interface's hardware is operable to communicate physical signals within and outside of the illustrated example distributed computing system 100. While the gateway server 170 is illustrated as being within the path for all communications between the network 130 and the business suite server 102, some communications between the network 103 and the business suite server 102 may be completed without using the gateway server 170. For example, one or more communications from client applications 146 may pass directly from the network 130 to the business suite server 102, such as when the client application 146 provides requests in a common format or protocol as those understood by the business suite server 102. In those instances, the example client application 146 may connect to processing layers within the business suite server 102 without translation or conversion by the gateway server 170. The connection may be to the UI layer 109, a platform adaptation layer 112, or any other suitable layer.

As illustrated in FIG. 1, the business suite server 102 includes a processor 106. Although illustrated as a single processor 106 in FIG. 1, two or more processors may be used according to particular needs, desires, or particular implementations of the environment 100. Each processor 106 may be a central processing unit (CPU), a blade, an application specific integrated circuit (ASIC), a field-programmable gate array (FPGA), or another suitable component. Generally, the processor 106 executes instructions and manipulates data to perform the operations of the business suite server 102. Specifically, the processor 106 executes the instructions and functionality required to receive and respond to requests from the client device 140, the mobile device 156, and/or allowing model-based backend services adaptations of business objects.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Objective C, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate.

The business suite server 102 also includes a memory 107, or multiple memories 107. The memory 107 may include any type of memory or database module and may take the form of volatile and/or non-volatile memory including, without limitation, magnetic media, optical media, random access memory (RAM), read-only memory (ROM), removable media, or any other suitable local or remote memory component. The memory 107 may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto associated with the purposes of the business suite server 102. Additionally, the memory 107 may include any other appropriate data, such as VPN applications, firmware logs and policies, firewall policies, a security or access log, print or other reporting files, as well as others.

While memory 107 is illustrated as an integral component of the business suite server 102, in alternative implementations memory 107 (or a portion thereof) can be external to the business suite server 102 and/or the example distributed computing system 100.

The business suite server 102 further includes an application programming interface (API) 111. The API 111 may include specifications for routines, data structures, and object classes. The API 111 may be either computer language-independent or dependent and refer to a complete interface, a single function, or even a set of APIs. In some implementations, the API 111 can be used to interface between the business suite application 108 and/or one or more components of the business suite server 102 or other components of the example distributed computing system 100, both hardware and software. For example, in one implementation, the business suite application 108 can utilize API 111 to communicate with the client device 140 and/or the mobile device 156. Although the API 111 is shown as a stand-alone component within the business suite server 102, there may be multiple other APIs in the example distributed computing system 100 that are integrated into or accessible by individual components, both hardware and software.

The service layer 115 provides software services to the example distributed computing system 100. The functionality of the business suite system may be accessible for all service consumers via this service layer. Software services, such as business suite navigation, provide reusable, defined business functionalities through a defined interface. The defined interface may be software written in extensible markup language (XML) or other suitable language. While illustrated as an integrated component of the business suite server 102 in the example distributed computing system 100, alternative implementations may illustrate the service layer 115 as a stand-alone component in relation to other components of the example distributed computing system 100. Moreover, any or all parts of the service layer 115 may be implemented as child or sub-modules of another software module or enterprise application (not illustrated) or of another hardware module (not illustrated) without departing from the scope of this disclosure. In some instances, the service layer 115 can be associated with a particular service registry 122 (illustrated in memory 107), in which one or more service definitions can be available and used for execution of the services as requested by clients, devices, and applications within the system 100.

The memory 107, i.e., a back-end data system, holds data for the business suite server 102. In some implementations, the memory 107 includes business object 117, business object model 120, and business object model data 118. Although illustrated as single instances, there may be more than one instance of the business object 117, business object model 120, and business object data 118.

The business object 117 can be considered a representation of an intelligible business/non-business entity, such as an account, an order, employee, an invoice, a financial report, etc. The business object 117 may encompass both functions, for example, in the form of methods, and data, such as one or more properties. For example, an account business object 117 may have properties such as Name, Priority, Value, etc. Business objects 117 may reduce system complexity by reducing a system into smaller units. The implementation details of business objects 117 are typically hidden from a non-development user and may be accessed through the defined functions and encapsulated data. Business objects 117 also form a point of entry of the functions and data of a system and enable the system to easily share, communicate, display, or otherwise operate with other systems. A business object 117 may also be considered the target of a request for data in a particular business suite, for example through a web page, and may contain a view to be displayed when the business object 117 is accessed. In some implementations, the business object 117 can control the location of a selected view, personalized views for a specific business suite user, and dynamic views. While illustrated as integrated within memory 107 of the business suite server 102 in the example distributed computing system 100, in alternative implementations the business object 117 can be stored external to the business suite server 102.

The business object model 120 is a structured way of representing relationships, associations, roles, etc. of business objects 117 applicable to an organization. For example, the business object model 120 may be represented through the use of an entity-relationship diagram (ERD) or other suitable diagram or descriptive method. An example of a business object model 120 for ProductSeller may include root business objects 117 such as Account and Order, each of which may contain their own methods, properties, and relationships to other dependent objects in the business object model 120. The root business objects 117 may also have associations with other dependent business objects 117. Examples of a dependent object for the Account root business object 117 may include AccountAddressUS. Example dependent objects for the Order root business object 117 may include OrderPartner and OrderItemShipmentData. While illustrated as integrated within memory 107 of the business suite server 102 in the example distributed computing system 100, in alternative implementations the business object model 120 can be stored external to the business suite server 102.

The business object data 118 is data associated with a specific instance of a business object 117. For example, for the example AccountAddressUS dependent object above, there may be properties Name, Title, Address1, Address2, City, State, and PostalCode. Business object data 118 would be the data associated with each property, for example, Name="XYZ, Inc.", Address1="12345 Any Street", Address2="Suite ABC", City="Some City", etc. In some implementations, the business object model data 118 may include, among other things: text, images, sounds, videos, and animations. While illustrated as integrated within memory 107 of the business suite server 102 in the example distributed computing system 100, in alternative implementations the business object model data 118 can be stored external to the business suite server 102.

The business object processing framework (BOPF) model 124 is also stored in memory 107 (or an alternative suitable location), and is associated with a business object processing framework included within the business logic layer 110. The BOPF model 124 provides information that assists the business logic layer 110 in accessing and understanding the organization and contents of the various business objects 117 stored in memory 107. Additionally, the business logic layer 110 allows operations for accessing, creating, and interacting with business objects 117 to be performed. The business logic layer 110 may receive requests from various applications and users for information associated with those business objects 117. Using the BOPF model 124 and the business object model 120, the business logic layer 110 can perform operations on the business objects 117 and their respective business object data 118 to provide responsive sets of information and visualizations associated with the same. The BOPF model 124 and the business object model 120 may be semantically similar, but may have different presentations. In some instances, the business object model 120 may be provided as or described with global data types following a UN/CEFACT CCTS standard. The BOPF model 124 may, in some instances, use internal data types.

Access to the business suite server 102 is provided through one or more client applications 146 and/or mobile applications 162, for example a web browser or other suitable GUI application interfacing with a user interface (UI) presentation layer 109 that further interfaces with an application programming interface (API) provided by the business logic layer 110. The business logic layer's APIs provide a consistent interface for a GUI application to access business objects 117 (and their respective data) associated with the business suite application 108.

Returning to memory 107, a GBI configuration table 126 is further illustrated as included therein. The GBI configuration table 126 assists the gateway BOPF integration (GBI) module 113 in providing a way to access the business objects and their corresponding data without requiring frequent updates to the metadata and data models associated with the data adapter with a low implementation effort for different business objects 117 and business object models 120. Specifically, the GBI configuration table 126 stores information defining different types of views and view instances into particular business objects 117 and business object models 120. The information defined in the views, for example, define the combination or subcombination of structure from within a particular business object 117 and/or set of business objects 117, an implementation of which may allow the business logic layer 110 to understand the specific combinations of nodes, subnodes, and attributes of the business object(s) 117 and accessing them via 111 are of importance to a particular view. A view instance can identify the corresponding business object data 118 associated with the view, and can allow the business logic layer 110 to access said data via its available operations. In some instances, the information defined in the GBI configuration table 126 may be predefined for use in floor plans and other user interface-related operations, providing users with a view into various business objects and their associated data. The GBI configuration table 126 may be stored in any suitable format, including a database table, spreadsheet, comma-separated value (CSV) file, or a text file, among others.

The GBI module 113 acts as a generic integration layer that bridges communications between the gateway of the gateway server 170 and the business logic layer 110 via the API layer 111. The GBI module 113 interacts with the illustrated with the Platform Adaption Layer 112 and Data Adapter 114 of FIG. 1 to create appropriate connections to the business objects 117 and business object data 118 associated with the particular service called via the gateway server 170 by a particular client or device. For further description of the GBI module 113, a description of the gateway server 170 is provided.

Various computing platforms (e.g., mobile computing platforms, applications, desktop systems, portal systems, etc.) may access the business suite server 102 through the gateway server 170. The gateway server 170 provides a defined API and acts as an interface/gateway between clients (e.g., mobile device 156, client device 140) and the business suite server 102. In some implementations, the gateway server 170 can communicate with various systems using OData through hypertext transfer protocol (HTTP) or hypertext transfer protocol secure (HTTPS) requests. In some implementations, the gateway server 170 can use a remote function call (RFC) interface to communication with ABAP and/or non-ABAP programs. In some implementations, the gateway server 170 can be stand-alone. In some implementations, the gateway server 170 can be incorporated into any component of the example distributed computing system 100. In some implementations the gateway server 170 may be a hardware server, a software server, and/or a virtual server. In some implementations, the gateway server 170 can be part of a web server, a streaming server, an RSS server, or other suitable server.

Open Data Protocol (OData) is a web protocol for querying and updating data and allows for a user to request data from a data source over the Hypertext Transfer Protocol and receive results back from the data source in formats such as Atom Publishing Protocol (Atom), Javascript Object Notation (JSON), Extensible Markup Language (XML), etc. In some implementations, the request may be divided into multiple segments. In some implementations, the multiple request segments may made and/or received concurrently and/or in parallel. Mobile computing and other computing platforms, such as smartphones and tablet computers, can use OData and are an increasingly important method of access to business suite information. To provide access to the business suite server 102 using OData-compliant computing platforms, a data adapter 114 is used to at least provide object model mapping and runtime conversion of data associated with the mapped object model.

The gateway server 170 may receive OData-compliant requests from a system from within or outside environment 100, where the gateway server 170 converts the OData-compliant request into a business suite-compliant request and communicates the request to the business logic layer 110 via the provided API 111. In some instances, the gateway server 170 may provide the received request directly to the corresponding system, i.e., the business suite server 102 with a built-in or embedded data adapter 114. For example, the data adapter 114 in FIG. 1 is illustrated as within the business suite system 102. The business logic layer 110 receives data responsive to the OData request from the business suite's operations and transmits that data via the API 111 to the data adapter 114. The data adapter 114 converts the received data to OData-compliant data, which can be passed back to the gateway server 170. The gateway server 170 then transmits the converted OData-compliant data to the requesting client, device, or system. While FIG. 1 illustrates the data adapter 114 as integrated with or included in the business suite server 102, in alternative implementations, all or portions of the data adapter 114 can be implemented in other components of the example distributed computing system 100. In some instances, the data adapter 114 can be a part of the gateway server 170, while in others, the data adapter 114 may interface with the gateway server 170 and/or the business suite server 102 as a stand-alone component.

In general, the data adapter 114 can include a metadata provider class (MPC) and a data provider class (DPC) that are used to access the business object data stored within the associated system. The MPC is used to define the model and the metadata associated with the service being requested. The DPC implements the functionality for data retrieval, the creation of new data, and the update or deletion of existing data. Previously, call to different business objects 117 and/or portions of different business objects 117 require additional knowledge and programming for providing an MPC and DPC corresponding to the information required by users. In the present disclosure, however, a generic MPC and a generic DPC are provided, which are adapted to particular service calls based on information retrieved from the GBI configuration table 126. The generic MPC uses the table's view information, while the DPC uses the view instance information, to call to the business logic layer 110 and retrieve the correct business object information from the business suite server 102. By using this solution, users can define the particular information to be associated with particular services, thereby allowing a low cost/effort model for providing access to a plurality of business objects. The generic data adapter 114 can be used, along with an updated GBI configuration table 126, to access the correct information for each call. Additional MPCs and DPCs are not needed for each service. The GBI module 113, described above, can identify the service associated with a received request, retrieve the appropriate view and/or view instance information stored in the GBI configuration table 126 associated with that service, and use that information to adapt the business object-related requests via the API 111 to the business logic layer 110.

The business suite server 102 also includes the OData channel 116, where the OData channel 116 allows for communication between the gateway server 170 and the business suite server 102. In general, the OData channel 116 provides a component for providing and enabling OData services and operations to be performed. For example, the OData channel 116 may include a metadata component and a runtime component for processing information received from the gateway server 170.

The metadata component manages metadata for messages received from the gateway server 170, where the metadata describes OData models that are exposed as OData service documents and OData metadata documents. The metadata may contain references to object models. The metadata infrastructure manages access to content based upon metadata, and exposes the standardized description of OData services by assembling OData service documents and metadata documents from internal and external sources. The metadata component may include or be associated model information from the GBI configuration table 126, the business object model 124, and the service registry 122. This stores a link between particular OData services and an actual implementation of the particular OData service, accessing the correct API 111 and business object 117. The requests received from the gateway server 170 can be analyzed to determine the corresponding OData service associated with the request.

The runtime component of the OData channel 116 can analyze and process requests from the requesting system. In some implementations, the runtime component may embed features such as automatic logging and tracing, configuration-based routing, transaction handling, etc. In some implementations, some common services can be offered using an API for reuse by the OData runtime. Examples of common services may include metering services for enabling usage-based charging and push service notifications. The OData runtime may contain functionality required to exposes OData services.

The business suite server 102 includes a platform adaptation layer 112, which provides a layer for customization and connections between the data adapter 114 and the business logic layer 110. The platform adaptation layer 112 may include functionality for assisting the GBI module 113 in adapting requests for information from the business logic layer 110.

The illustrated example distributed computing system 100 also includes the client device 140, or multiple client devices 140. The client device 140 may be any computing device operable to connect to or communicate with at least the business suite server 102 via the network 130 using a wireline or wireless connection. In general, the client device 140 comprises an electronic computer device operable to receive, transmit, process, and store any appropriate data associated with the example distributed computing system 100.

The illustrated client device 140 further includes a client application 146. The client application 146 is any type of application that allows the client device 140 to request and view content on the client device 140. In some implementations, the client application 146 can be and/or include a web browser. In some implementations, the client application 146 can use parameters, metadata, and other information received at launch to access a particular set of data from the server 102. Once a particular client application 146 is launched, a user may interactively process a task, event, or other information associated with the business suite server 102. Further, although illustrated as a single client application 146, the client application 146 may be implemented as multiple client applications in the client device 140.

The illustrated client device 140 further includes an interface 142, a processor 144, and a memory 148. The interface 142 is used by the client device 140 for communicating with other systems in a distributed environment—including within the example distributed computing system 100—connected to the network 130; for example, the business suite server 102, as well as other systems communicably coupled to the network 130 (not illustrated). Generally, the interface 142 comprises logic encoded in software and/or hardware in a suitable combination and operable to communicate with the network 130. More specifically, the interface 142 may comprise software supporting one or more communication protocols associated with communications such that the network 130 or interface's hardware is operable to communicate physical signals within and outside of the example distributed computing system 100.

As illustrated in FIG. 1, the client device 140 includes a processor 144. Although illustrated as a single processor 144 in FIG. 1, two or more processors may be used according to particular needs, desires, or particular implementations of the example distributed computing system 100. Each processor 144 may be a central processing unit (CPU), an application specific integrated circuit (ASIC), a field-programmable gate array (FPGA), or another suitable component. Generally, the processor 144 executes instructions and manipulates data to perform the operations of the client device 140. Specifically, the processor 144 executes the functionality required to send requests to the business suite server 102 and to receive and process responses from the business suite server 102.

Further, the illustrated client device 140 includes a GUI 152. The GUI 152 interfaces with at least a portion of the example distributed computing system 100 for any suitable purpose, including generating a visual representation of a web browser. In particular, the GUI 152 may be used to view and navigate various web pages located both internally and externally to the business suite server 102.

The illustrated client device 140 also includes a memory 148, or multiple memories 148. The memory 148 may include any memory or database module and may take the form of volatile or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 140. Additionally, the memory 148 may include any other appropriate data, such as VPN applications, firmware logs and policies, firewall policies, a security or access log, print or other reporting files, as well as others.

There may be any number of client devices 140 associated with, or external to, the example distributed computing system 100. For example, while the illustrated example distributed computing system 100 includes one client device 140, alternative implementations of the example distributed computing system 100 may include multiple clients 140 communicably coupled to the business suite server 102 and/or the network 130, or any other number suitable to the purposes of the example distributed computing system 100. Additionally, there may also be one or more additional client devices 140 external to the illustrated portion of the example distributed computing system 100 that are capable of interacting with the example distributed computing system 100 via the network 130. Further, the term "client" and "user" may be used interchangeably as appropriate without departing from the scope of this disclosure. Moreover, while the client device 140 is described in terms of being used by a single user, this disclosure contemplates that many users may use one computer, or that one user may use multiple computers.

The illustrated client device 140 is intended to encompass any computing device such as a desktop computer, laptop/notebook computer, wireless data port, smart phone, personal data assistant (PDA), tablet computing device, one or more processors within these devices, or any other suitable processing device. For clarity, FIG. 1 also includes a mobile device 156, which includes a mobile application 162, along with an interface 158, processor 160, memory 164, and GUI 166 similar to those of the client device 140. Using the gateway server 170 to route and interpret requests, various types of clients, devices, and other applications may interact with the business suite server 102, such as through OData-compliant requests. For example, the client device 140 may comprise a computer that includes an input device, such as a keypad, touch screen, or other device that can accept user information, and an output device that conveys information associated with the operation of the business suite server 102 or the client device 140 itself, including digital data, visual information, or a GUI 152, as shown with respect to the client device 140.

Network 130 facilitates wireless or wireline communications between the components of the environment 100 (i.e., between the business suite server 102 and one or more mobile and client devices), as well as with any other local or remote computer, such as additional clients, servers, or other devices communicably coupled to network 130 but not illustrated in FIG. 1. In the illustrated environment, the network 130 is depicted as a single network in FIG. 1, but may be a continuous or discontinuous network without departing from the scope of this disclosure, so long as at least a portion of the network 130 may facilitate communications between senders and recipients. The network 130 may be all or a portion of an enterprise or secured network, while in another instance, at least a portion of the network 130 may represent a connection to the Internet. In some instances, a portion of the network 130 may be a virtual private network (VPN). Further, all or a portion of the network 130 can comprise either a wireline or wireless link. Example wireless links may include 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations. The network 130, however, is not a required component of the present disclosure.

While FIG. 1 is described as containing or being associated with a plurality of elements, not all elements illustrated within environment 100 of FIG. 1 may be utilized in each alternative implementation of the present disclosure. For example, although FIG. 1 depicts the data adapter 114 as separate from the gateway server 170. In some instances, the data adapter 114 may be part of or included within the gateway server 170. Still further, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 2:
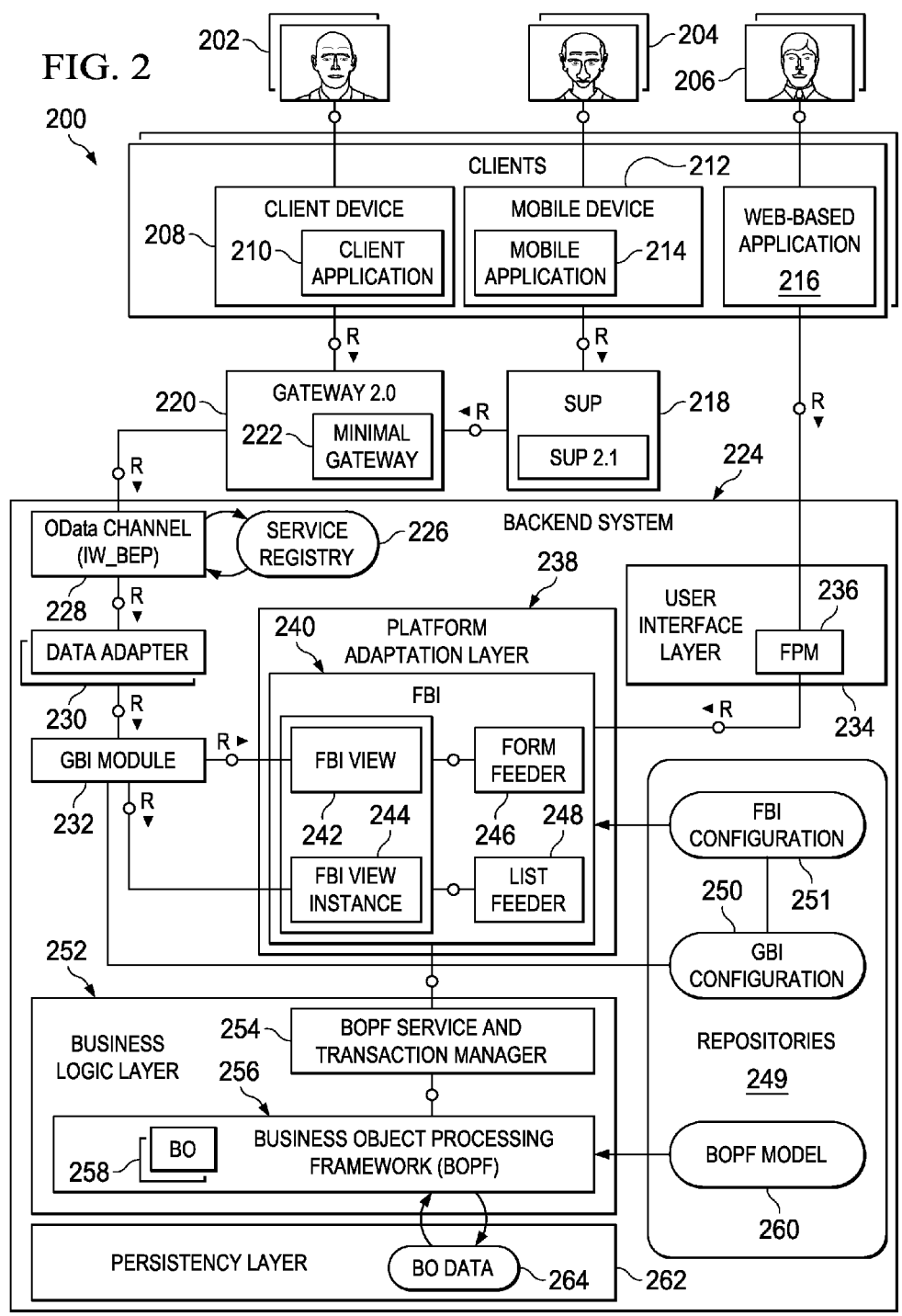
FIG. 2 is a block diagram illustrating a detailed example implementation of a system for allowing model-based backend services adaptations of business objects.

FIG. 2 is a block diagram illustrating a detailed example implementation of a system 200 for allowing model-based backend services adaptations of business objects. For purposes of description, FIG. 2 presents a detailed illustration of an implementation based in part on the system 100 described in FIG. 1.

As illustrated in FIG. 2, requests are received at a backend system 224 (e.g., a business suite server 102 in FIG. 1) from a plurality of applications and users. In the illustrated system, requests are received from a client application 210 associated with a client device 208 (and user 202), a mobile application 214 associated with a mobile device 212 (and user 204), and a web-based application 216 (and user 206). Requests from both the client application 210 and the mobile application 214 are routed through the gateway 220 prior to being passed to the backend system 224, while requests from the web-based application 216 are provided directly to the backend system 224.

As illustrated, the mobile application's requests are first processed by a mobile platform 218 for formatting and processing mobile application 214 requests. Some mobile applications 214 may send their requests directly to the gateway 220, while others may first route requests and messages through the mobile platform 218 for initial processing. The messages can then be received at the gateway 220. The gateway 220 (using the minimal gateway 222) relays those messages to the appropriate OData channel 228 associated with the backend system 224. The OData channel 228 is associated with the illustrated service registry 226, which provides service definitions and access through the OData-compliant requests received via the OData channel 228. The OData channel 228 thus exposes a plurality of services that can be accessed by external users, clients, and applications to interact with the information stored at and managed by the backend system 224. Further, processing operations performed by or associated with the backend system 224 can be accessed through these exposed services, allowing the external applications to request information exposed by the service, and receive responsive messages and data sets in return via the gateway 220.

The OData channel 228 can pass information related to a received request, including the service called, to the data adapter 230. The data adapter 230 can adapt the information included in the request into a backend system-compliant language and/or format, and use the operations and data stored in the backend system 224 to provide a responsive message. In the present disclosure, the requests received from the external applications and associated with particular services can be linked to specific business object views and view instances. The data adapter 230 can interact with the GBI module 232 to provide particular service-related views into the business objects associated with the request. Specifically, the GBI module 232 can identify the service associated with the received request, and access the GBI configuration table 250. The GBI configuration table 250 can be customized to define the particular views and view instances associated with particular business objects, and associate those views with one or more services. When a particular service is requested, the GBI module 232 identifies the corresponding views and view instances to be used with the data adapter 230 to access the business logic layer 252, its business objects 258, and one or more BOPF models 260, via the BOPF service and transaction manager 254 as well as their corresponding business object data 264 (stored in the persistency layer 262). In some instances, the GBI configuration table 250 can have access to, or can request information from, the FBI configuration 251. The FBI configuration 251 is a repository component containing model information of the FBI views 242 existing in the system.

In the illustrated instance, a platform adaptation layer 238 is associated with a floorplan manager BOPF integration component (FBI) 240. The FBI 240 is meant for rapid development of user experience compliant UI development. The FBI 240 provides configurable and codeless integration of floorplan manager (FPM) and business objects implemented in the business object processing framework (BOPF) 256. In other words, the configuration of particular views into floorplans and business objects can be defined by users, with those definitions used to access the corresponding objects via calls to the BOPF's processing capabilities. By defining views as to how to access the business objects, a generic interface for implementing those views can be provided, removing an implementation and development hurdle for many users.

The FBI 240 includes an FBI view 242 and an FBI view instance 244. The FBI view 242 portion of the FBI 240 is used for the provision of metadata from the BOPF layer, while the FBI view instance component 244 is used for the consumption of the services that are provided by the BOPF-based BOs. The form feeder 246 is used for providing data associated with the business objects or views upon business objects that is provided in a one-to-one relationship, while the list feeder 248 is used for providing data associated with the business objects or associated views provided in a one-to-many relationship. When the FBI view 242 is called at runtime, it can read the metadata associated with the FBI view 242 from FBI configuration 251 in order to process the correct portions of the business object. The GBI configuration table 250, may be a logical extension of the FBI configuration table 251, incorporating services associated with particular metadata otherwise associated with the FBI configuration table 251, and allowing information to be accessed and used by the GBI module 232.

Once the correct view and view instance are retrieved from the GBI configuration table 250, the data adapter 230 and GBI module 232 format the request to the business logic layer 252 for business object-related data. Specifically, a request formatted for the BOPF 256 is created and sent to the business logic layer 252 (specifically, the BOPF service and transaction manager 254), which uses the operations of the BOPF 256 to identify one or more business objects 258 associated with the particular operations associated with the received request, and which access the BO's associated BOPF model data (i.e., BO metadata) and business object data 264. The information is collected and returned to the data adapter 230, which can return that data and structure to the OData channel (228), where it can be placed back into its appropriate format, and returned, via the gateway 220 (and its minimal gateway 222), to the requesting application.

As illustrated, the web-based application 216 can use the functionality of the FBI 240 to access the data from the business logic layer 252 via a floorplan manager (FPM) 236.

Figure 3:
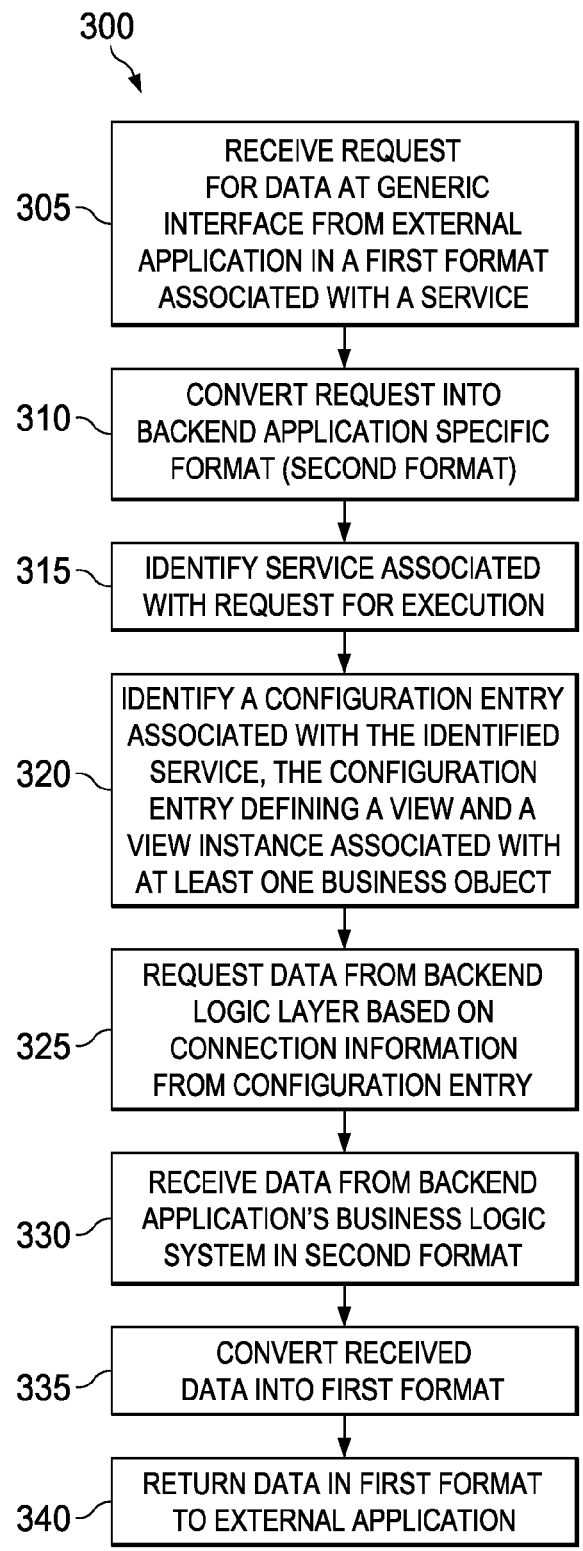
FIG. 3 is a flow chart of an example method for retrieving backend application data through the use of a generic interface and configuration data.

FIG. 3 is a flow chart of an example method 300 for retrieving backend application data through the use of a generic interface and configuration data. For clarity of presentation, the description that follows generally describes method 300 in the context of FIGS. 1 and 2. However, it will be understood that method 300 may be performed, for example, by any other suitable system, environment, software, and hardware, or a combination of systems, environments, software, and hardware as appropriate. For example, one or more of the business suite server, the client, or other computing device (not illustrated) can be used to execute method 300 and obtain any data from the memory of the client, the business suite server, or the other computing device (not illustrated).

At 305, a request is received for data at a generic interface from an external application, where the request is in a first format. Further, the request may be associated with a specific service. In some instances, the first format can be an OData-compliant format. In some instances, the request may have been directed to the receiving system by a gateway system responsible for routing requests provided by various clients, systems, and/or applications to provide a single interface for interacting with one or more systems and/or applications.

At 310, the received request is converted into a second format associated with a backend application to allow for further processing. The second format can be any format suitable for use at a system or application associated with the system at which the request is received. In one example, that system may be a business suite server as described in FIGS. 1 and 2, where the second format is a data and/or messaging format suitable for communications and operations within the business suite server and/or the server's applications with which the requests are associated.

At 315, the service associated with the received request is identified. As described above, one or more services may be associated with specific configurations that can be used to generate, from a generic data adapter, service-specific views and view instances on one or more business objects and/or other suitable objects. The service may be identified based, for instance, on the location at which the received request was sent and received. In some instances, the received request may include within its payload and/or associated metadata a clear or derivable identification of the associated service. In some instances, algorithms for deriving the associated service can be executed to identify the service. In other instances, the associated service identification may be retrieved from the received request.

At 320, a configuration entry from the configuration table associated with the identified service is identified. The identified configuration entry can define one or more views and view instances associated with one or more business objects included in or associated with the backend application. The views can provide a description of the structure of the business objects and the particular portions of the business object to be accessed, while the view instances are used to retrieve the information from those portions and interact with the services and operations associated with the business object. The configuration entry may be an entry in a database table linked to the identified service, such as by using service identifiers as primary keys in the database table. In some instances, the database (or other suitable file or storage mechanism) can be queried based on the identified service or its unique service identifier, with the corresponding configuration information being returned in response to the query.

At 325, the information retrieved from the configuration entry associated with the identified service is used to request the corresponding data from the backend application's business logic layer. In some instances, a generic metadata provider class and a generic data provider class can be modified or updated with the retrieved information in order to provide a request to the business logic layer specific to the identified service at 330. The request may be received and interpreted by the business logic layer, which can then access the corresponding business objects, metadata, and data associated with the request. The data corresponding to the requested business objects and data can be returned in the second format associated with the backend application. At 335, that data can be converted into the first format by the data adapter or other suitable component. At 340, the returned data is returned to the requesting external application in the first format in response to the initially received request.

Figure 4:
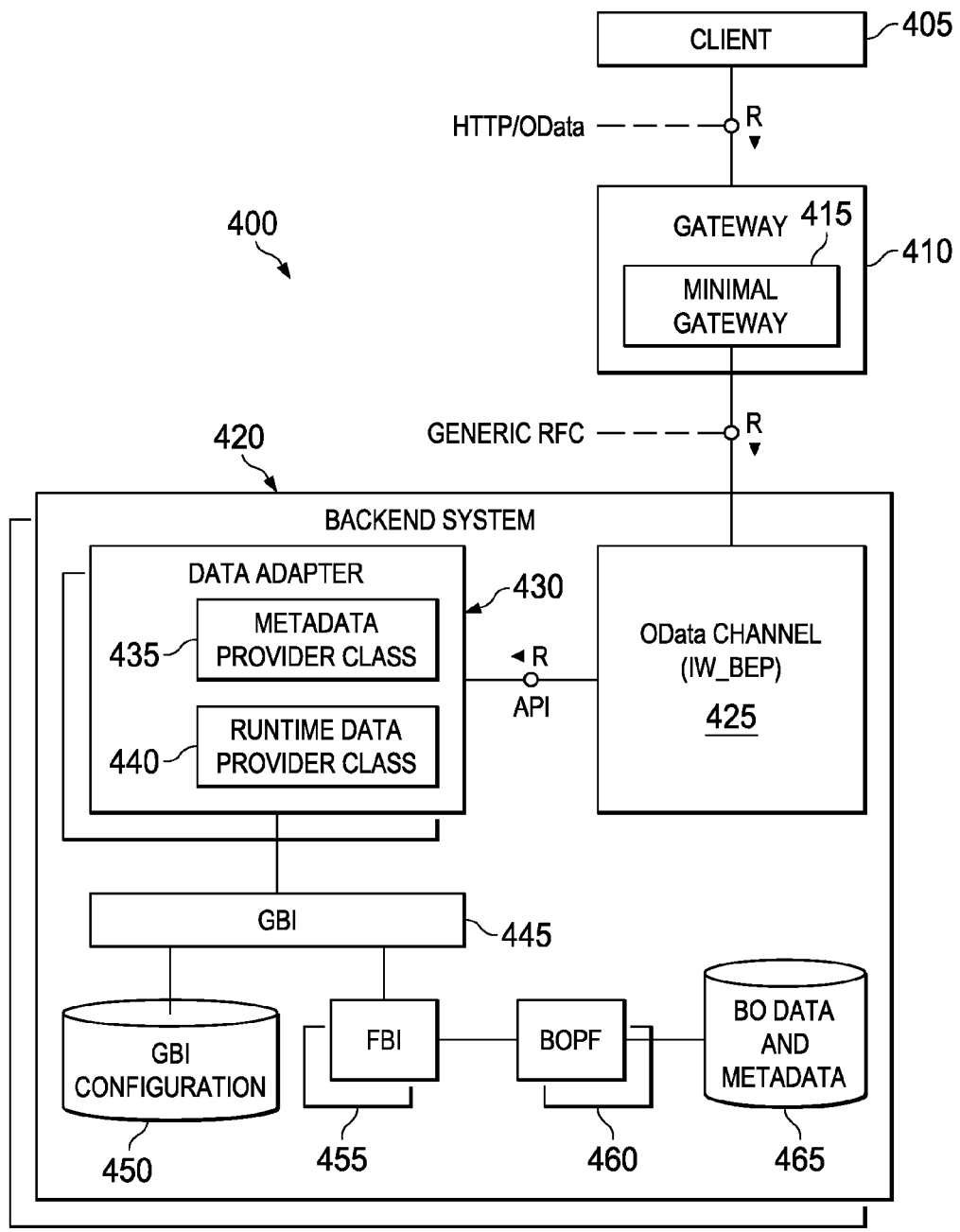
FIG. 4 illustrates a detailed illustration of a data adapter and related components for allowing model-based backend service adaptations of business objects according to a particular implementation of a suitable system.

FIG. 4 illustrates a detailed illustration 400 of a data adapter and related components for allowing model-based backend service adaptations of business objects according to a particular implementation of a suitable system. As illustrated, a client 405 is provided, sending a request using an OData-compliant protocol, to the gateway system 410. The gateway application 415 transforms the received request into an RFC message sent to the OData channel 425 of the backend system 420. The OData channel 425 provides, via defined interfaces to the data adapter 430, at least a portion of the message contents.

The data adapter 430 includes a generic metadata provider class 435 and a runtime data provider class 440. These classes would normally need to be specifically implemented for each possible interaction with different business objects and/or combinations of business objects. Using the generic classes, however, the information specific to a particular business object, set of business objects, or portions thereof, can be determined at runtime based on stored configuration information associated with a particular service requested by the client 405. The data adapter 430 interacts with the GBI module 445 to identify the configuration information (stored in the GBI configuration 450) associated with the particular service being called. The GBI configuration 450 may include or be associated with an FBI configuration (not shown) that assists the GBI configuration 450 and the GBI module 445 in accessing view-relevant information stored within or associated with the FBI configuration. That information can be passed back to the classes, where the correct data adapter 430 classes are configured, which can then be provided to the FBI 455. The data classes of the data adapter 430 can use the FBI 455 to pass specific business object requests to the BOPF 460. The BOPF 460 can access the business object data and metadata repositories (collectively, BO data and metadata 465) to access and return the corresponding business object data. The data is returned to the data adapter 430, then subsequently through the OData channel 425 back to the gateway 410, and ultimately, back to the client 405.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, comprising:
receiving, at a generic interface associated with at least one backend application, a request for data from a particular backend application;
identifying a service for execution associated with the received request based at least in part on the received request;
identifying a configuration entry associated with the identified service in a configuration table;
determining, based on the configuration entry and the requested data, at least one business object associated with the particular backend application to be accessed to provide the requested data, the at least one business object being determined from a plurality of business objects associated with the particular backend application;
determining, based on the configuration entry, a set of access-related information associated with the at least one business object, the access-related information including a view providing a metadata-based description of the at least one business object associated with the backend application and a view instance used for accessing the at least one business object; and
requesting data from a business logic layer of the particular backend application based, at least in part, on the access-related information associated with the at least one business object, wherein the requesting is performed using the view instance included in the access-related information.

2. The method of claim 1, wherein the received request for data is received in a first format, and wherein the request associated with the request for data from the business logic layer of the particular backend application is sent in a second format.

3. The method of claim 2, wherein the first format is an OData-compliant format, and where the second format is a backend application-compliant format, the method further comprising:
converting the received request for data from the particular backend application into the backend application-compliant format.

4. The method of claim 1, wherein requesting data from the business logic layer of the particular backend application comprises:
adapting an implementation of a metadata provider class associated with a generic data adapter based on the view included in the access-related information;
adapting an implementation of a data provider class associated with the generic data adapter based on the view instance included in the access-related information; and using the adapted metadata provider class and the adapted data provider class to access the business logic layer.

5. The method of claim 4, wherein the business logic layer is associated with a set of business object metadata and a set of business object data.

6. The method of claim 5, wherein using the adapted metadata provider class and the adapted data provider class to access the business logic layer comprises generating a request to access the at least one business object defined by the metadata-based description of the retrieved view information.

7. A non-transitory, computer storage medium encoded with a computer program, the program comprising instructions that when executed by one or more computers cause the one or more computers to perform operations comprising:
receiving, at a generic interface associated with at least one backend application, a request for data from a particular backend application;
identifying a service for execution associated with the received request based at least in part on the received request;
identifying a configuration entry associated with the identified service in a configuration table;
determining, based on the configuration entry and the requested data, at least one business object associated with the particular backend application to be accessed to provide the requested data, the at least one business object being determined from a plurality of business objects associated with the particular backend application;
determining, based on the configuration entry, a set of access-related information associated with the at least one business object, the access-related information including a view providing a metadata-based description of the at least one business object associated with the backend application and a view instance used for accessing the at least one business object; and
requesting data from a business logic layer of the particular backend application based, at least in part, on the access-related information associated with the at least one business object, wherein the requesting is performed using the view instance included in the access-related information.

8. The computer storage medium of claim 7, wherein the received request for data is received in a first format, and wherein the request associated with the request for data from the business logic layer of the particular backend application is sent in a second format.

9. The computer storage medium of claim 8, wherein the first format is an OData-compliant format, and where the second format is a backend application-compliant format, the operations further comprising:
converting the received request for data from the particular backend application into the backend application-compliant format.

10. The computer storage medium of claim 7, wherein requesting data from the business logic layer of the particular backend application comprises:
adapting an implementation of a metadata provider class associated with a generic data adapter based on the view included in the access-related information;
adapting an implementation of a data provider class associated with the generic data adapter based on the view instance included in the access-related information; and
using the adapted metadata provider class and the adapted data provider class to access the business logic layer.

11. The computer storage medium of claim 10, wherein the business logic layer is associated with a set of business object metadata and a set of business object data.

12. The computer storage medium of claim 11, wherein using the adapted metadata provider class and the adapted data provider class to access the business logic layer comprises generating a request to access the at least one business object defined by the metadata-based description of the retrieved view information.

13. A system comprising:
one or more computers; and
a non-transitory computer-readable medium coupled to the one or more computers having instructions stored thereon which, when executed by the one or more computers, cause the one or more computers to perform operations comprising:
receiving, at a generic interface associated with at least one backend application, a request for data from a particular backend application;
identifying a service for execution associated with the received request based at least in part on the received request;
identifying a configuration entry associated with the identified service in a configuration table;
determining, based on the configuration entry and the requested data, at least one business object associated with the particular backend application to be accessed to provide the requested data, the at least one business object being determined from a plurality of business objects associated with the particular backend application;
determining, based on the configuration entry, a set of access-related information associated with the at least one business object, the access-related information including a view providing a metadata-based description of the at least one business object associated with the backend application and a view instance used for accessing the at least one business object; and
requesting data from a business logic layer of the particular backend application based, at least in part, on the access-related information associated with the at least one business object, wherein the requesting is performed using the view instance included in the access-related information.

14. The system of claim 13, wherein the received request for data is received in a first format, and wherein the request associated with the request for data from the business logic layer of the particular backend application is sent in a second format.

15. The system of claim 14, wherein the first format is an OData-compliant format, and where the second format is a backend application-compliant format, the operations further comprising:
converting the received request for data from the particular backend application into the backend application-compliant format.

16. The system of claim 13, wherein the access-related information associated with the at least one business object associated with the backend application includes view information providing a metadata-based description of the at least one business object associated with the particular backend application.

* * * * *